Patented May 8, 1945

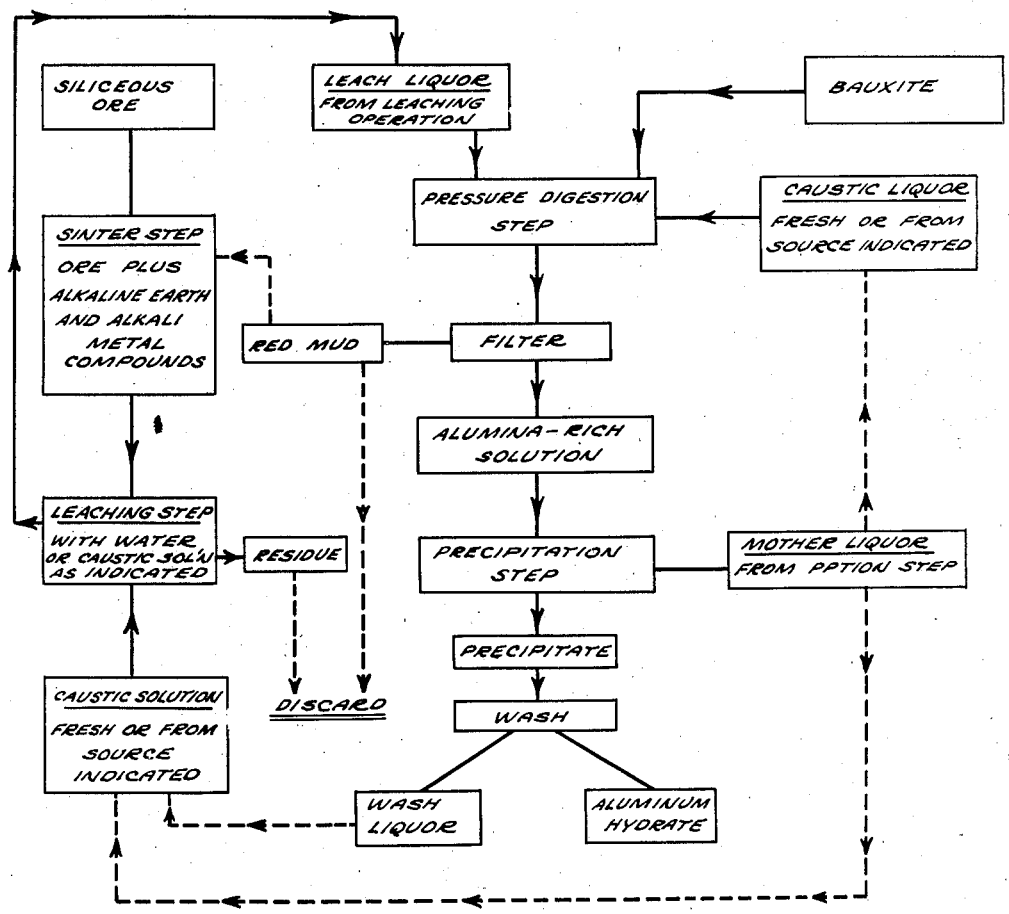

2,375,342

UNITED STATES PATENT OFFICE 2,375,342

EXTRACTION OF ALUMINA FROM ORES

Ralph Waldo Brown, East St. Louis, Ill., assignor to Aluminum Company of America, Pittsburgh, Pa., a corporation of Pennsylvania Application May 18, 1942, Serial No. 443,402

3 Claims. (Cl. 23—141)

This invention relates to methods of recovering alumina of high purity from low grade alumina-bearing ore. Heretofore, the Bayer process, or modifications thereof, has been used for the recovery, from alumina-bearing ore, of most of the high purity alumina used in the production of aluminum. The Bayer process consists in first pressure-digesting a slurry of bauxite and caustic liquor to form an alumina-rich solution. This solution is then separated from its accompanying residue which is called "red mud" and consists of undissolved portions of the bauxite as well as insolubles formed during digestion. This red mud is discarded as waste material. The alumina-rich solution is then seeded with freshly precipitated alumina and agitated to precipitate alumina as aluminum hydrate. After separation from the hydrate thus precipitated, the spent or mother liquor is returned to the pressure digestion step where its caustic values are again utilized in the treatment of more bauxite. Successful commercial operation of this Bayer process is confined to the treatment of bauxite containing less than about 6 per cent by weight of silica. Bauxites of higher silica content raise the cost and decrease the efficiency of the process. Clays, and other ores bearing alumina values, usually in silicate form, are not successfully treated by the Bayer process. Among the other low grade ores not susceptible of such treatment is the aforesaid red mud which contains insolubilized alumina and caustic values. Years of operation of the Bayer process have accumulated large stocks of this waste material.

Many processes of various types have been proposed for the commercial extraction of alumina from these low grade alumina-bearing ores, but none have been commercially operated to successfully produce high purity alumina at a commercially acceptable cost. Accordingly, most present commercial installations available for the recovery of alumina operate on the principle of the Bayer process and are, therefore, unsuitable for the treatment of low grade ores by any process hitherto proposed.

Among the objects of this invention is the provision of a method of obtaining high purity alumina from low grade alumina-bearing ores which can be operated at comparatively low cost and which may, if desired, be operated, in part at least, with existing equipment. Other objects will appear in the following description of the invention.

In the operation of the methods of this invention, recovery of alumina values from the low grade ores above described is effected simultaneously and in conjunction with operation of the Bayer-type process on bauxite, preferably low-silica bauxite. As a first and preliminary step, the low grade ore is treated to solubilize its alumina values and to separate these values from the silica and other unwanted impurities in the ore. To this end the red mud, clay or other silicious ore is mixed with proportioned quantities of alkaline earth compound and alkali metal compound and then sintered. Preparatory to mixing, these materials, including the ores, should be ground or pulverized, if necessary, to particles of such size as will promote complete mixing and effective reaction during sintering. The proportions of the mixture are adjusted to promote the purpose of the sintering which is to insolubilize impurities and to solubilize alumina and other wanted values so that a separation may be effected upon subsequent leaching of the sintered mass. The function of the alkaline earth compound is to insolubilize the silica. For this purpose any such compound which forms, on reaction, insoluble silicates may be used, but the readily available and low cost limestone is preferred. The amount to be added will depend upon the amount of silica in the ore. If, as in the case of some red mud, the ore initially contains alkaline earth compound, the amount necessarily added may be correspondingly reduced. At least a slight excess is desirable in the final mixture. For instance, if limestone be used, the amount present should be somewhat in excess of that required to furnish sufficient CaO to form, with the silica, the insoluble dicalcium silicate ($2CaO.SiO_2$). The alkali metal compound should be added to the mixture in amount sufficient to furnish at least a slight excess of available alkali metal over that required to form soluble alkali metal aluminate with the alumina content of the ore. Some cheap source of alkali metal is preferred and the plentiful and cheap soda ash is usually employed. Desirability of the use of larger amounts of alkaline earth compound and alkali metal compound than those above indicated may appear, but amounts exceeding those necessary to the operation, while not harmful, may be merely wasteful.

The mixture of ore, alkaline earth compound, and alkali metal compound, proportioned as above described, is subjected to a sintering operation at such temperatures as to cause fritting or sintering of the particles without fusion or melting of large portions of the mixture. Since melting of substantial portions of the mass would interfere with the recovery of values during subsequent leaching operations, excessive temperatures should be avoided. During sintering, most of the silica is insolubilized as alkaline earth silicate and most of the alumina is released to form soluble alkali metal aluminate. If, as is often the case when red mud is the ore being treated, the ore contains insolubilized caustic values, a substantial portion of these are also released in soluble form and made available for subsequent recovery by leaching.

Sintering being complete, the sinter is then leached for the purpose of recovering therefrom the soluble alumina and caustic values. Water may be used as the leaching medium as may also solutions containing caustic values. These latter may be obtained, if desired, as a by-product of the operation of the Bayer process as hereinafter described. In any event, the result of the leaching is a leach liquor containing most of the alumina values solubilized by the sintering operation. This liquor will also contain, however, quantities of solubilized impurities, principally silica. This reflects the inability of the sintering operation to effect complete separation between the desired alumina values and the unwanted silica values of the ore. To hasten the leaching process the leaching media may be heated, but preferably to temperatures not much in excess of 200° F. since higher temperatures promote formation of insoluble complexes containing alumina values. The residual insoluble portions of the sinter, which now consist principally of alkaline earth silicate as well as other insolubilized impurities plus some alumina values, are discarded. The leach liquor, containing much of the desirable values of the original ore, is now ready for further treatment in accordance with the principles of this invention.

As above mentioned the leach liquor contains substantial amounts of soluble silica. The precipitation processes previously known and proposed for the purpose of recovering the alumina content of this liquor are not capable of precipitating all the available alumina without also precipitating the silica. Since the quantity of silica present in the leach liquor is usually about 2 per cent or more by weight of the available alumina, the result is an alumina precipitate containing much more silica than is acceptable in a high purity alumina. Production of metallic aluminum of desired commercial purity requires an alumina containing less than 0.1 per cent of silica and usually less than 0.06 per cent. The problem is, therefore, one of obtaining such an alumina from the leach liquor.

The present invention meets this problem in the manner now described. As above mentioned the invention contemplates simultaneous operation of the sintering and leaching of low grade ores and of a Bayer process operating, as previously described, on bauxite. It is the gist of the invention that these two processes are tied together by transferring the leach liquor resulting from the low grade ore process to the Bayer process where the leach liquor is added to, and becomes a part of, the bauxite-caustic liquor slurry formed prior to the digestion step. The resultant slurry contains, therefore, not only the bauxite and the caustic liquor of the usual Bayer process slurry, but also the alumina and caustic values of the leach liquor. The ingredients of this slurry are so adjusted that the ratio of alumina to caustic in the alumina-rich solution produced by the subsequent digestion will be suitable to the later handling of the solution and the precipitation of alumina therefrom by the auto-precipitation process. When the caustic is present as sodium hydroxide (the usual form), the ratio usually desired, expressed as $Al_2O_3$ divided by the total NaOH present (including that combined with the alumina), is from about 0.8 to about 1. This slurry is then digested in the usual manner at steam pressures of about 60 to 200 pounds per square inch. The alumina-rich solution formed by this digestion is separated from insolubles by filtering, sedimentation, or like processes, and the insolubles, after being washed to remove entrained caustic and alumina values, are discarded. The alumina-rich solution is then treated to precipitate its alumina values. Auto-precipitation is accomplished by the well-known methods of seeding and agitation such as those described by Bayer (U. S. Patent No. 382,505), Sherwin (U. S. Patent No. 1,251,296), and Fickes (U. S. Reissue Patent No. 13,668). The precipitate thus obtained is of high purity containing less than about 0.06 per cent by weight of silica. It is washed to remove residual caustic values and as washed is the end product of the process. The mother liquor resulting from the precipitation is composed of most of the caustic values and the unprecipitated alumina values. It is returned, at least in part, to the digestion step where it furnishes the caustic liquor necessary to the digestion of the next batch of bauxite. There it returns its residual alumina values to the process. A portion of this mother liquor may be diverted to serve as leaching media in the leaching of the low grade ore sinter. Similarly the alkaline wash waters resulting from the washing operation above described may be used in the leaching process or may be concentrated for use in the digestion step.

The introduction of the leach liquor from the low grade ore process into the Bayer process at the point where the bauxite-caustic liquor slurry is formed overcomes the difficulties previously encountered in obtaining a high purity alumina precipitate from such leach liquor. The subsequent steps of the Bayer process eliminate the silica with the result that the finally precipitated alumina is substantially silica-free. This result is achieved with the simultaneous recovery of similar alumina from bauxite, and thus existing equipment is utilized to perform, at low cost, a dual function. Other and additional advantages flow from the process herein described and claimed. The Bayer process as normally practiced is a cyclic process in which the caustic values originally introduced into the process to dissolve alumina values from bauxite are recovered, after precipitation of alumina from the alumina-rich solution formed by the digestion, and returned to the slurry where again they are used to treat bauxite. Some loss of caustic values takes place, however, during each cycle and replacement thereof is a material element of operation cost. In the practice of the present invention these required replacement values are furnished to the process by the introduction into the slurry of the leach liquor from the low grade ore process, thus obviating the necessity of separate caustic replenishment. Moreover, these caustic values are obtained during the sintering operation from crude and cheap alkali compounds, thus materially reducing the caustic costs of the Bayer process.

Therefore, by the improved processes of this invention, it is possible to commercially produce high purity alumina from low grade ores, to simultaneously reduce the cost of extracting alumina from bauxite, and to accomplish this total result by utilization, in part, of existing equipment and facilities.

The accompanying drawing is a flow sheet illustrative of the process.

What I claim is:

1. In a process of extracting alumina of high purity from low grade alumina-bearing ore, including sintering of the ore with quantities of alkaline earth compound and alkali metal compound proportioned to solubilize the alumina values thereof and leaching the sinter thus formed to produce leach liquor containing soluble alumina values, the improvement comprising forming a slurry composed of bauxite, caustic liquor, and said leach liquor in such proportioned amounts as will on digestion form an alumina-rich solution having auto-precipitating characteristics, digesting said slurry under pressure to form an alumina-rich solution and thereafter precipitating alumina values from said solution.

2. In a combination process of extracting high purity alumina from low grade alumina-bearing ore and of extracting similar alumina from bauxite which includes sintering low grade ore with amounts of alkaline earth and alkali metal compounds proportioned to solubilize the alumina values of said ore and leaching the resultant sinter to form leach liquor containing soluble alumina values and which further and separately includes pressure digestion of a slurry of bauxite and caustic liquor to form an alumina-rich solution, separation of said solution from insolubles and precipitation of alumina from said solution, the improvement consisting of adding said leach liquor to said slurry prior to said digestion whereby the alumina values of the leach liquor are included in the said alumina-rich solution, the components of the final slurry being so proportioned as to produce, on said pressure digestion, an alumina-rich solution having auto-precipitating characteristics.

3. In a cyclic process of extracting alumina from bauxite which comprises forming a slurry of bauxite and caustic liquor, pressure-digesting said slurry to form an alumina-rich solution, separating said solution from insolubles, precipitating alumina from said solution, separating the mother liquor from the precipitate and returning the mother liquor to the slurry to provide further caustic liquor for the treatment of additional bauxite, the improvement consisting of sintering low grade alumina-bearing ore with quantities of alkaline earth and alkali metal compounds proportioned to solubilize the alumina values of said ore as alkali metal aluminate, leaching the resultant sinter to form a leach liquor containing soluble alkali metal aluminate and adding said leach liquor to said slurry of bauxite and caustic liquor, the components of the final slurry being so proportioned as to produce, on said pressure digestion, an alumina-rich solution having auto-precipitating characteristics.

RALPH WALDO BROWN.